(12) United States Patent
Oshitani et al.

(10) Patent No.: US 7,428,826 B2
(45) Date of Patent: Sep. 30, 2008

(54) EJECTOR CYCLE DEVICE

(75) Inventors: Hiroshi Oshitani, Toyota (JP); Hirotsugu Takeuchi, Nagoya (JP); Yoshiaki Takano, Kosai (JP); Mika Saito, Kariya (JP); Naohisa Ishizaka, Okazaki (JP)

(73) Assignee: Denso Corporation, Kariya (JP)

( * ) Notice: Subject to any disclaimer, the term of this patent is extended or adjusted under 35 U.S.C. 154(b) by 254 days.

(21) Appl. No.: 11/377,488

(22) Filed: Mar. 16, 2006

(65) Prior Publication Data

US 2006/0207285 A1 Sep. 21, 2006

(30) Foreign Application Priority Data

Mar. 18, 2005 (JP) ............................. 2005-079210

(51) Int. Cl.
*F25B 41/00* (2006.01)

(52) U.S. Cl. .......................................... 62/500; 62/503

(58) Field of Classification Search .................. 62/170, 62/174, 191, 278, 500, 503, 512, 84, 192; 417/76, 87, 151; 165/908
See application file for complete search history.

(56) References Cited

U.S. PATENT DOCUMENTS

| 6,477,857 | B2 | 11/2002 | Takeuchi et al. | |
|---|---|---|---|---|
| 6,574,987 | B2 | 6/2003 | Takeuchi et al. | |
| 6,729,149 | B2 * | 5/2004 | Takeuchi | 62/191 |
| 6,799,435 | B2 * | 10/2004 | Saito et al. | 62/500 |
| 6,834,514 | B2 * | 12/2004 | Takeuchi et al. | 62/500 |
| 6,923,019 | B2 * | 8/2005 | Kawakubo et al. | 62/506 |
| 7,299,645 | B2 * | 11/2007 | Oshitani et al. | 62/191 |
| 2003/0066301 | A1 * | 4/2003 | Takeuchi | 62/191 |
| 2003/0200764 | A1 * | 10/2003 | Takeuchi et al. | 62/500 |
| 2004/0031596 | A1 * | 2/2004 | Nishida et al. | 165/140 |
| 2004/0079102 | A1 * | 4/2004 | Umebayashi et al. | 62/324.1 |
| 2005/0178150 | A1 | 8/2005 | Oshitani et al. | |
| 2005/0268644 | A1 | 12/2005 | Oshitani et al. | |

FOREIGN PATENT DOCUMENTS

JP 2002-349977 A * 12/2002

OTHER PUBLICATIONS

Office Action dated Jul. 13, 2007 in Chinese Application No. 2006 1007 1703.9 with English translation thereof.

* cited by examiner

*Primary Examiner*—Mohammad M Ali
(74) *Attorney, Agent, or Firm*—Harness Dickey & Pierce, PLC (57) ABSTRACT

An ejector cycle device includes a compressor, a refrigerant radiator disposed to radiate heat of refrigerant discharged from the compressor, an ejector having a nozzle, a first evaporator for evaporating refrigerant from the ejector, a branch passage, which is branched from a refrigerant downstream side of the refrigerant radiator and is connected to a refrigerant suction port of the ejector, a throttle member disposed in the branch passage to decompress refrigerant flowing from the refrigerant radiator, a second evaporator disposed in the branch passage between the throttle member and the refrigerant suction port of the ejector, and a gas-liquid separator having an inlet connected to a downstream side of the first evaporator and an outlet from which gas refrigerant is introduced to a refrigerant suction side of the compressor. Thus, refrigerant amounts flowing to the first and second evaporators can be suitably controlled.

27 Claims, 10 Drawing Sheets

EJECTOR CYCLE DEVICE

CROSS-REFERENCE TO RELATED APPLICATION

This application is related to and claims priority from Japanese Patent Application No. 2005-79210 filed on Mar. 18, 2005, the contents of which are hereby incorporated by reference.

BACKGROUND OF THE INVENTION

1. Field of the Invention

The present invention relates to an ejector cycle device having an ejector, which is used for decompressing a fluid while being used as a refrigerant circulating unit for circulating a fluid by entrainment function of a driving fluid jetted at a high speed. For example, the ejector cycle device can be suitably used for cooling plural cooling subjects.

2. Description of Related Art

Figure 11:
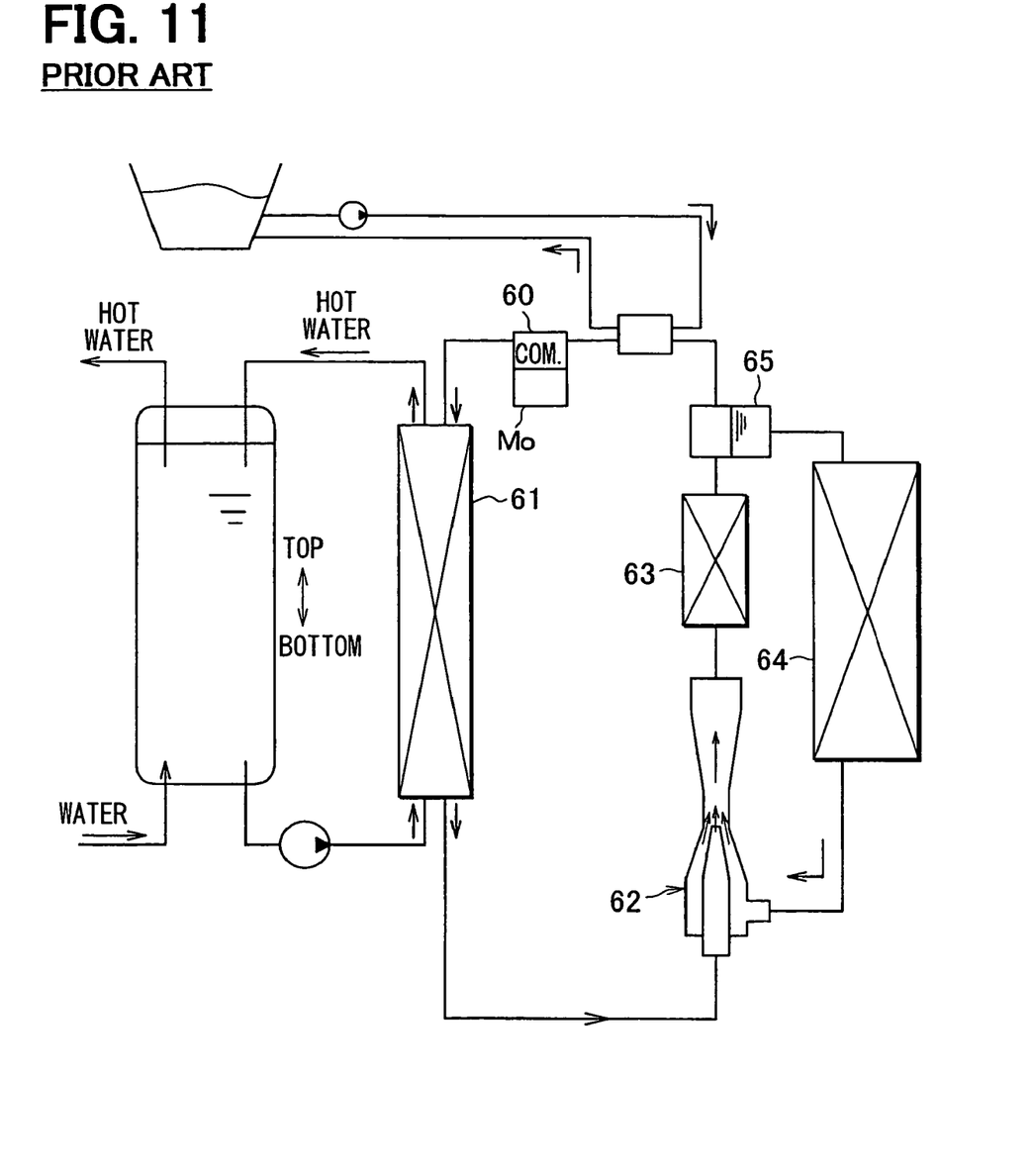
FIG. 11 is a schematic diagram showing a conventional ejector cycle device.

A vapor-compression refrigerant cycle device (ejector cycle device) having an ejector 62 is described in JP Patent No. 3322263 (corresponding to U.S. Pat. No. 6,477,857 and No. 6,574,987). The ejector cycle device includes a compressor 60, a refrigerant radiator 61, the ejector 62, first and second evaporators 63, 64 and a gas-liquid separator 65. The first evaporator 63 is located between a refrigerant discharge side of the ejector 62 and the gas-liquid separator 65, and the second evaporator 64 is located between a refrigerant suction port of the ejector 62 and a refrigerant outlet of the gas-liquid separator 65.

In this ejector cycle device, a throttle open degree of a nozzle portion of the ejector 62 is controlled, so that refrigerant at an outlet side of the first evaporator 63 becomes in a gas-liquid two-phase state while a cooling capacity of the second evaporator 64 is controlled. In this case, because a distribution ratio between a refrigerant amount flowing through the first evaporator 63 and a refrigerant amount flowing through the second evaporator 64 is determined by the ejector 62, it is difficult to suitably control the flow amounts of refrigerant flowing through both the first and second evaporators 63, 64.

SUMMARY OF THE INVENTION

In view of the foregoing problems, it is an object of the present invention to provide an ejector cycle device having plural evaporators, which can be operated with a high efficiency while easily adjusting flow amounts of refrigerant flowing through the plural evaporators.

It is another object of the present invention to provide an ejector cycle device having plural evaporators, which can be operated with a high efficiency while preventing a liquid refrigerant return to a compressor.

According to an aspect of the present invention, an ejector cycle device includes a compressor for compressing refrigerant, a refrigerant radiator disposed to radiate heat of refrigerant discharged from the compressor, an ejector which includes a nozzle portion for decompressing and expanding refrigerant from the refrigerant radiator, a first evaporator for evaporating refrigerant flowing out of the ejector, a first branch passage branched from a position between a refrigerant downstream side of the refrigerant radiator and an upstream side of the nozzle portion and is connected to a refrigerant suction port of the ejector, a first throttle member disposed in the first branch passage to decompress refrigerant flowing from the refrigerant radiator, a second evaporator disposed in the first branch passage between the first throttle member and the refrigerant suction port of the ejector, and a gas-liquid separator located between a refrigerant outlet of the first evaporator and a refrigerant suction side of the compressor for separating refrigerant into gas refrigerant and liquid refrigerant. The gas-liquid separator has an outlet from which the separated gas refrigerant is introduced to the refrigerant suction side of the compressor.

Here, the refrigerant amount flowing into the first evaporator can be adjusted by the capacity of the compressor and a throttle degree of the nozzle portion of the ejector, and the refrigerant amount flowing into the second evaporator can be adjusted by the first throttle member. Accordingly, the refrigerant flowing amount to the first and second evaporators can be respectively suitably adjusted based on its thermal loads, while the ejector cycle device can be operated with high efficiency. Furthermore, because the gas liquid separator is located between the outlet of the first evaporator and the refrigerant suction side of the compressor, it can prevent liquid refrigerant from being introduced to the compressor. For example, the first evaporator can be located to cool a first cooling subject, and the second evaporator can be located to cool a second cooling subject difference from the first cooling subject.

According to another aspect of the present invention, an ejector cycle device includes a compressor for compressing refrigerant, a refrigerant radiator disposed to radiate heat of refrigerant discharged from the compressor, a first throttle member for decompressing refrigerant from the refrigerant radiator, a first evaporator for evaporating refrigerant flowing out of the first throttle member, an ejector which includes a nozzle portion for decompressing and expanding refrigerant from the refrigerant radiator, a first branch passage which is branched from a position between a refrigerant downstream side of the refrigerant radiator and an upstream side of the nozzle portion and is connected to a refrigerant suction port of the ejector, a second throttle member disposed in the first branch passage to decompress refrigerant flowing from the refrigerant radiator, a second evaporator disposed in the first branch passage between the second throttle member and the refrigerant suction port of the ejector, and a gas-liquid separator having an outlet from which gas refrigerant is introduced to the refrigerant suction side of the compressor. In this case, the refrigerant amount flowing to the first and second evaporators can be easily controlled regardless of the structure of the ejector.

In the present invention, the first evaporator and the second evaporator can be assembled to form an integrated unit or can be provided separately from each other. Further, an additional branch passage can be provided, and a third evaporator can be provided in the branch passage.

In addition, an inner heat exchanger can be located to perform heat exchange between refrigerant from the gas-liquid separator and refrigerant from the refrigerant radiator. Furthermore, the refrigerant flowing into the refrigerant radiator can be set at a pressure higher or lower than the critical pressure of the refrigerant.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF PREFERRED EMBODIMENTS

Preferred embodiments of the present invention will be described hereinafter with reference to the appended drawings.

First Embodiment

Figure 1:
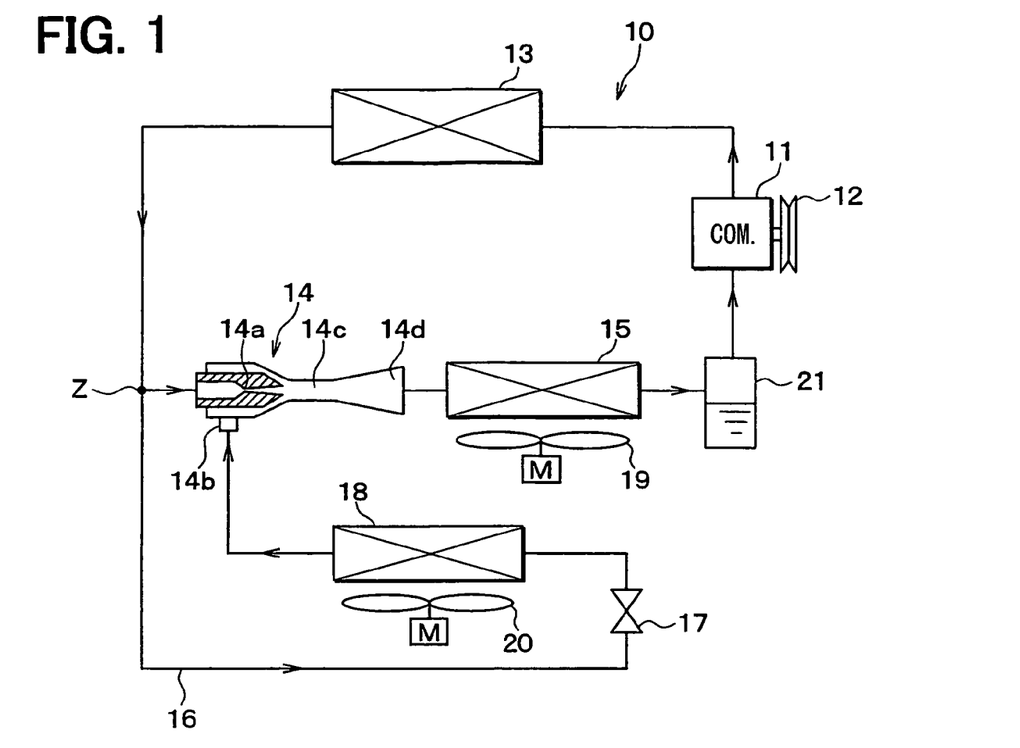
FIG. 1 is a schematic diagram showing an ejector cycle device according to a first embodiment of the present invention.

In this embodiment, an ejector cycle device 10 of the first embodiment is typically used as a refrigerant cycle device for a vehicle air conditioner.

The ejector cycle device 10 includes a compressor 11 for drawing and compressing refrigerant. For example, the compressor 11 is driven and rotated by a vehicle engine (not shown) through an electromagnetic clutch 12 and a belt. The compressor 11 may be a variable displacement compressor which can adjust its refrigerant discharge capacity by changing a refrigerant discharge amount, or a fixed displacement compressor which can adjust its refrigerant discharge capacity by changing a working ratio of the compressor operation. The working ratio of the compressor operation can be changed by performing interruption of the electromagnetic clutch 12. Alternatively, when an electrical compressor is used as the compressor 11, the refrigerant discharge capacity can be adjusted by adjusting a rotation speed of an electrical motor.

A refrigerant radiator 13 is located at a refrigerant discharge side of the compressor 11. The refrigerant radiator 13 cools high-pressure refrigerant discharged from the compressor 11 by performing a heat exchange between the high-pressure refrigerant and outside air (i.e., air outside a passenger compartment) blown by a cooling fan (now shown).

In the ejector cycle device 10 of this embodiment, refrigerant such as carbon dioxide ($CO_2$) is used so that the pressure of high-pressure refrigerant before being decompressed becomes higher than the critical pressure. Thus, when the ejector cycle device 10 is operated while the pressure of high-pressure refrigerant is set higher than the critical pressure, the high-pressure refrigerant is cooled in the refrigerant radiator 13 in the super-critical state without being condensed.

An ejector 14 is disposed downstream from the refrigerant radiator 13 in a refrigerant flow. The ejector 14 is a decompression unit for decompressing refrigerant, and is a kinetic pump for performing a transporting of a fluid by entrainment of a jet flow of a drive fluid injected at a high speed.

Specifically, the ejector 14 includes a nozzle portion 14a, a mixing portion 14c and a diffuser portion 14d. The nozzle portion 14a decompresses and expands refrigerant flowing from the refrigerant radiator 13 substantially in isentropic by reducing a refrigerant passage sectional area. The refrigerant flow speed is increased in the nozzle portion 14a by converting pressure energy of the refrigerant to speed energy of the refrigerant. The ejector 14 has a refrigerant suction port 14b from which gas refrigerant from a second evaporator 18 is drawn by the high-speed refrigerant stream jetted from the nozzle portion 14a.

The mixing portion 14c and the diffuser portion 14d are provided downstream from the nozzle portion 14a and the refrigerant suction port 14b. In the mixing portion 14c, refrigerant drawn from the suction port 14b and refrigerant jetted from the nozzle portion 14a are mixed, and the mixed refrigerant flows through the diffuser portion 14d. The speed energy of refrigerant (dynamic pressure) is converted to the pressure energy of refrigerant (stationary pressure) in the diffuser portion 14d by gradually increasing a passage sectional area of the diffuser portion 14d. The refrigerant flowing out of the diffuser portion 14d of the ejector 14 flows into a first evaporator 15.

A branch passage 16 is branched from a branch point Z between the refrigerant radiator 13 and an inlet portion of the nozzle portion 14a of the ejector 14. The branch passage 16 is a refrigerant passage from the refrigerant branch point Z to the refrigerant suction port 14b of the ejector 14.

A throttle mechanism 17 (throttle mechanism) is provided in the branch passage 16, and the second evaporator 18 is arranged in the branch passage 16 at a downstream refrigerant side of the throttle mechanism 17. The throttle mechanism 17 is operated to have a decompression function and a flow-amount adjusting function. For example, the throttle mechanism 17 is a fixed throttle such an orifice. Alternatively, an electrical control valve for controlling a valve open degree (passage throttle open degree) by using an electrical actuator can be used as the throttle mechanism 17.

In this embodiment, the first evaporator 15 is used for cooling a passenger compartment of the vehicle. Air blown by an electrical blower 19 is cooled by the first evaporator 15, and flows into the passenger compartment to dehumidify and cool the passenger compartment. Low-pressure refrigerant decompressed in the ejector 14 is evaporated in the first evaporator 15 by absorbing heat from air to be blown into the passenger compartment, thereby the first evaporator 15 has a cooling function. The gas refrigerant evaporated in the first evaporator 15 is drawn into the compressor 11, and is circulated in the refrigerant cycle.

In contrast, the second evaporator 18 can be used to performing a cooling operation in a refrigerator mounted to the vehicle, for example. Air inside a room of the refrigerator is circulated by an electrical blower 20 and is cooled by the second evaporator 18, so that the cooling operation of the refrigerator is performed. Low-pressure refrigerant decompressed in the throttle mechanism 17 is evaporated in the second evaporator 18 by absorbing heat from air blown by the electrical blower 20, thereby the second evaporator 18 has a cooling function. The gas refrigerant evaporated in the second evaporator 18 is drawn into the ejector 14 through the suction port 14*b*.

An accumulator 21 (gas-liquid separator) is arranged between a refrigerant outlet side of the first evaporator 15 and a refrigerant suction side of the compressor 11. The accumulator 21 can be formed into a vertical elongated tank in which refrigerant flowing out of the first evaporator 15 is separated into gas refrigerant and liquid refrigerant. The separated gas refrigerant is drawn into the suction side of the compressor 11 from an upper portion in the tank, and the separated liquid refrigerant is temporarily stored therein as surplus refrigerant in the refrigerant cycle. An oil return mechanism, for returning oil included in the liquid refrigerant stored in the tank to the compressor 11, can be provided in the accumulator 21.

Next, operation of the refrigerant cycle device having the ejector 14 will be described. When the compressor 11 is driven by a driving device (for example, the vehicle engine), high-temperature and high-pressure refrigerant compressed by and discharged from the compressor 11 flows into the refrigerant radiator 13 as shown in FIG. 1. Heat of high-temperature high-pressure refrigerant is radiated outside of the passenger compartment in the super-critical pressure by performing heat exchange in the refrigerant radiator 13. The high-pressure refrigerant flowing out of the refrigerant radiator 13 is branched at the branch point Z into a first refrigerant stream toward the inlet of the nozzle portion 14*a* of the ejector 14, and a second refrigerant stream toward the branch passage 16.

The refrigerant flowing into the ejector 14 is decompressed in the nozzle portion 14*a*. The nozzle portion 14*a* converts pressure energy of the high-pressure refrigerant to speed energy, and jets high-speed refrigerant from its jet port. Therefore, a pressure of refrigerant at the jet port of the nozzle portion 14*a* is reduced, and refrigerant (gas refrigerant) from the second evaporator 18 is drawn into the mixing portion 14*c* of the ejector 14 by a pressure difference between the pressure of refrigerant around the jet port of the nozzle portion 14*a* and the pressure of refrigerant at the refrigerant outlet of the second evaporator 18.

The refrigerant jetted from the nozzle portion 14*a* and the refrigerant drawn from the suction port 14*b* are mixed in the mixing portion 14*c* and flow into the diffuser portion 14*d*. Because the passage sectional area is enlarged in the diffuser portion 14*d*, the speed energy of the refrigerant is converted to the pressure energy in the diffuser portion 14*d*, so that the pressure of refrigerant is increased in the diffuser portion 14*d*. The pressurized refrigerant flowing out of the outlet port of the diffuser portion 14*d* flows into the first evaporator 15, and is introduced into the accumulator 21.

Refrigerant flowing into the accumulator 21 is separated into liquid refrigerant and gas refrigerant due to the density difference. The separated gas refrigerant is drawn into the suction side of the compressor 11 from a refrigerant outlet of the accumulator 21, and is compressed again in the compressor 11.

The refrigerant flowing into the branch passage 16 from the refrigerant radiator 13 is decompressed by the throttle mechanism 17, and is evaporated by absorbing heat from air blown by the electrical blower 20. Therefore, the interior of the refrigerator is cooled. The gas refrigerant flowing out of the second evaporator 18 flows into the suction port 14*b* of the ejector 14. The gas refrigerant drawn into the ejector 14 from the second evaporator 18 is mixed with the refrigerant jetted by the nozzle portion 14*a*, and flows into the first evaporator 15 to be circulated.

In the refrigerant cycle device of the first embodiment, the refrigerant flowing into the branch passage 16 is supplied into the second evaporator 18 through the throttle mechanism 17 while refrigerant from the diffuser portion 14*d* of the ejector 14 is supplied to the first evaporator 15. Therefore, both the first evaporator 15 and the second evaporator 18 are provided with cooling functions, simultaneously.

Because of the pressurization in the mixing portion 14*d* and the diffuser portion 14*b* of the ejector 14, a pressure difference is generated between the first evaporator 15 and the second evaporator 18. That is, the refrigerant evaporation pressure of the first evaporator 15 corresponds to the pressure after pressure-increased in the diffuser portion 14*b*. In contrast, because the refrigerant outlet side of the second evaporator 18 is coupled to the refrigerant suction port 14*b* of the ejector 14, a reduced pressure immediately after decompressed at the nozzle portion 14*a* is applied to the second evaporator 18.

Accordingly, the refrigerant evaporation pressure of the second evaporator 18 can be made lower than the refrigerant evaporation pressure of the first evaporator 15 by a predetermined pressure. Therefore, the refrigerant evaporation temperature of the second evaporator 18 can be made lower than the refrigerant evaporation temperature of the first evaporator 15 by a predetermined temperature. That is, the predetermined temperature difference can be set between the first evaporator 15 and the second evaporator 18 due to the pressure difference. Therefore, the cooling temperature of the refrigerator mounted to the vehicle can be set lower than the cooling temperature of the passenger compartment, thereby performing cooling operations of the refrigerator and the passenger compartment with different cooling temperatures.

Furthermore, the refrigerant amount flowing through the second evaporator 18 can be controlled independently by the throttle mechanism 17, without depending on the functions of the ejector 14. Therefore, the refrigerant amount flowing through the first evaporator 15 can be adjusted by the control of the refrigerant discharge capacity of the compressor 11 and the throttle characteristics of the ejector 14. As a result, the refrigerant amounts flowing through both the first and second evaporators 15, 18 can be easily adjusted in accordance with heat loads of the first and second evaporators 15, 18, respectively.

In this embodiment, the accumulator 21 used as a gas-liquid separator is provided at a refrigerant outlet side of the first evaporator 15. Therefore, even when the super-heating degree control at the refrigerant outlet side of the first evaporator 15 is not performed, the ejector cycle device can prevent liquid refrigerant from being introduced into the compressor 11.

In addition, the suction pressure of refrigerant drawn into the compressor 11 can be increased by the increased pressure in the diffuser portion 14*d*. Therefore, compression working amount in the compressor 11 can be reduced thereby reducing consumption power in the compressor 11.

Second Embodiment

Figure 2:
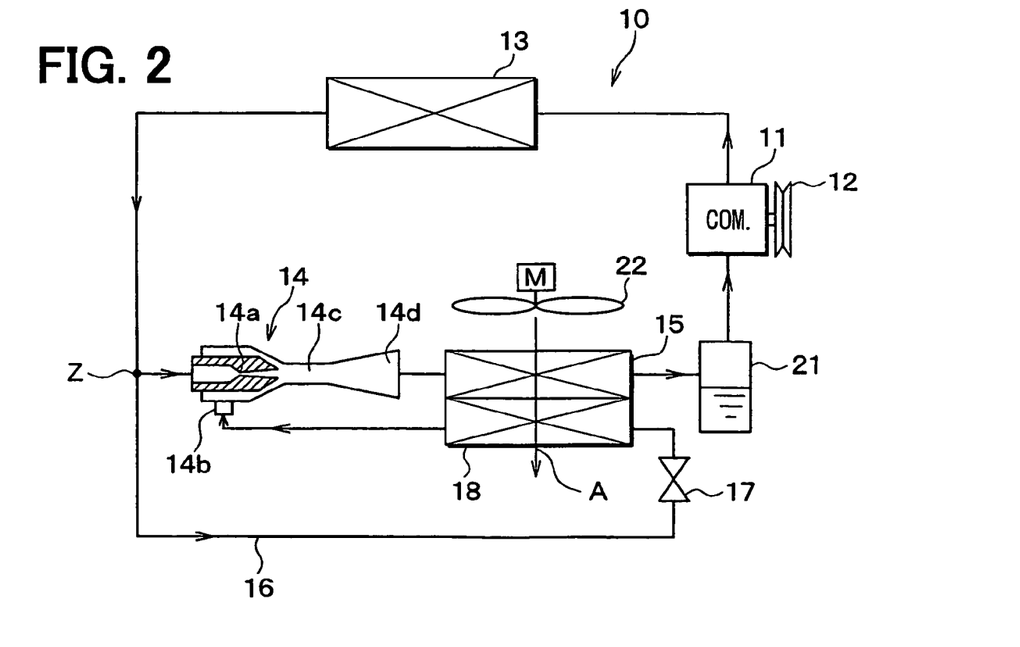
FIG. 2 is a schematic diagram showing an ejector cycle device according to a second embodiment of the present invention.

FIG. 2 shows an ejector cycle device 10 of the second embodiment. In the above-described first embodiment, the first evaporator 15 and the second evaporator 18 are respectively independently constructed to provide cooling capacities respectively independently. However, in the second embodiment, as shown in FIG. 2, first and second evaporators 15, 18 are assembled to form an integrate structure, so that a common cooling subject space such as an interior space of the passenger compartment or an interior space of the refrigerator can be cooled by using both the first and second evaporators 15, 18.

In the second embodiment, a single electrical blower 22 is used as air blowing means for blowing air toward the first and second evaporators 15, 18. In this embodiment, the first evaporator 15 having a relative high evaporation temperature is arranged at an upstream air side of the second evaporator 18 in an air flow direction A from the electrical blower 22.

Generally, the refrigerant evaporation temperature of the second evaporator 18 is lower than the refrigerant evaporation temperature of the first evaporator 15. Accordingly, it is possible to obtain a temperature difference between the refrigerant evaporation temperature and the air temperature in the first evaporator 15, and a temperature difference between the refrigerant evaporation temperature and the air temperature in the second evaporator 18. Therefore, both the cooling capacities of the first and second evaporators 15, 18 can be effectively obtained. As a result, air blown into the common cooling subject space can be effectively cooled by the combination of the first and second evaporators 15, 18.

In the second embodiment, when both the first and second evaporators 15, 18 are combined to form an integrated structure, evaporator construction members such as tubes, fins, tanks are formed from a metal such as aluminum, and can be integrally brazed.

In the second embodiment, the other parts of the ejector cycle device 10 can be made similarly to these of the above-described first embodiment.

Third Embodiment

Figure 3:
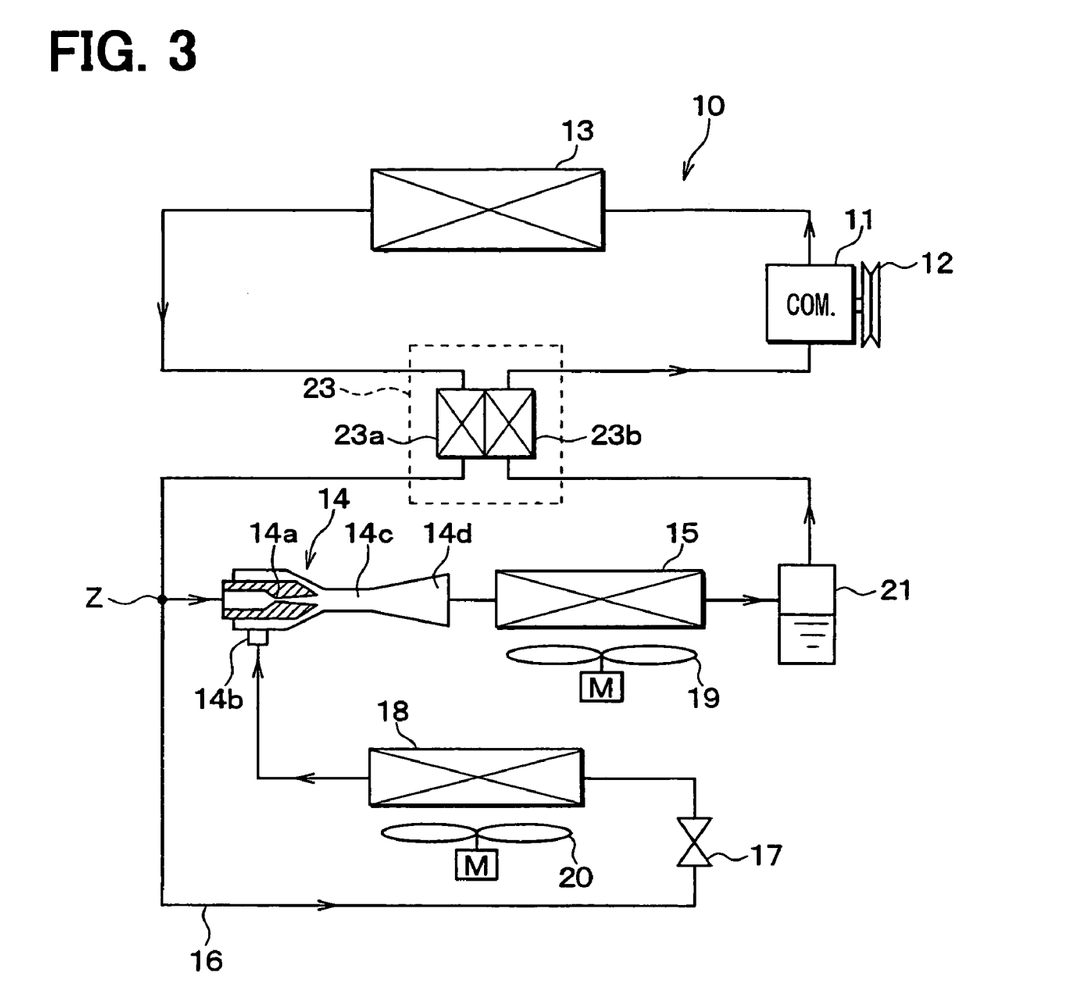
FIG. 3 is a schematic diagram showing an ejector cycle device according to a third embodiment of the present invention.

FIG. 3 shows an elector cycle device 10 of the third embodiment. In the third embodiment, an inner heat exchanger 23 is provided additionally relative to the ejector cycle device 10 of the above-described first embodiment.

The inner heat exchanger 23 includes a first refrigerant passage portion 23a in which high-pressure refrigerant from the refrigerant radiator 13 flows, and a second refrigerant passage portion 23b in which low-pressure refrigerant from the first evaporator 15 to the compressor 11 flows. The first refrigerant passage portion 23a of the inner heat exchanger 23 is connected between the refrigerant radiator 13 and the inlet of the nozzle portion 14a of the ejector 14, and the second passage portion 23b of the inner heat exchanger 23 is connected between a refrigerant outlet side of the accumulator 21 and the suction port of the compressor 11, thereby performing heat exchange between the high-pressure refrigerant and the low-pressure refrigerant in the inner heat exchanger 23.

By the heat exchange between the high-pressure refrigerant and the low-pressure refrigerant in the inner heat exchanger 23, the enthalpy of refrigerant flowing into the first and second evaporators 15, 18 can be reduced, and cooling capacities of the first and second evaporators 15, 18 can be included. As a result, the coefficient of performance (COP) of the ejector cycle device 10 can be effectively improved.

In the third embodiment, the other parts are similar to those of the above-described first embodiment.

Fourth Embodiment

Figure 4:
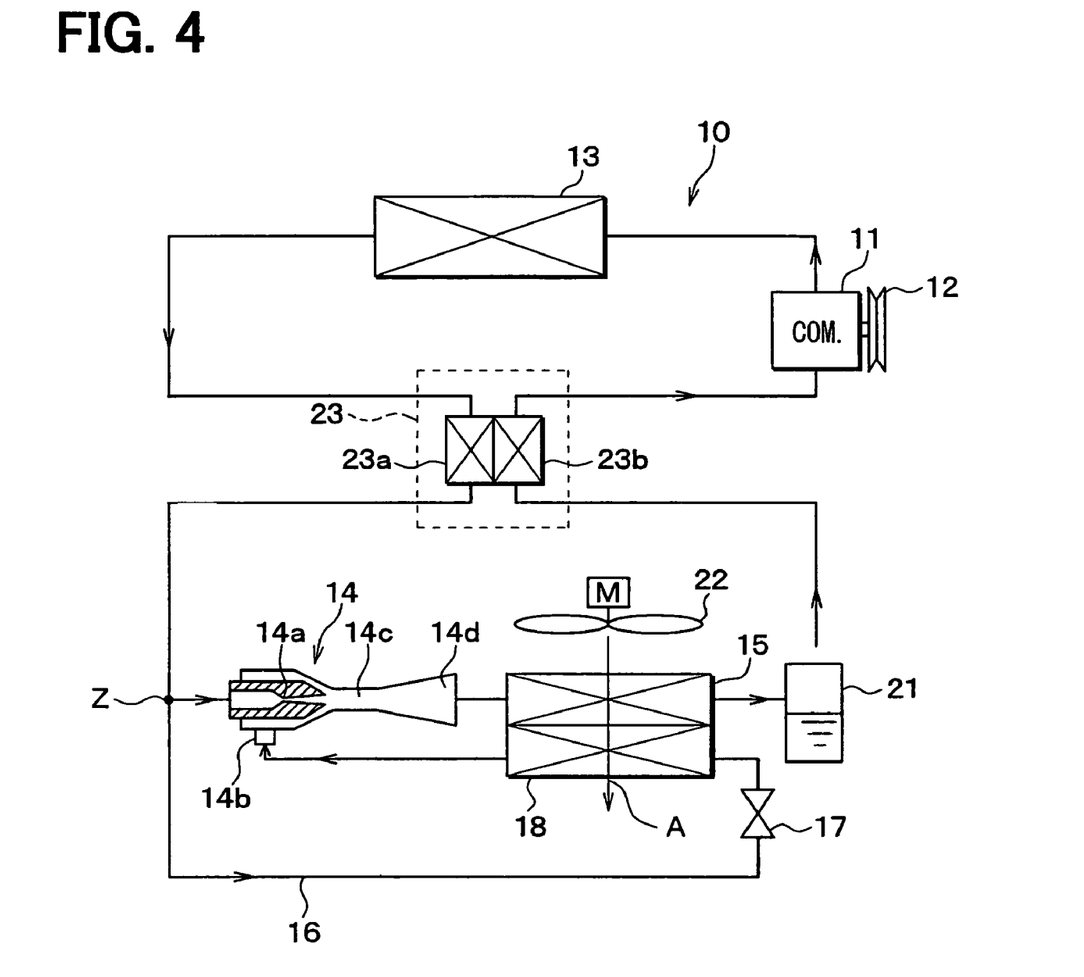
FIG. 4 is a schematic diagram showing an ejector cycle device according to a fourth embodiment of the present invention.

FIG. 4 shows an ejector cycle device 10 of the fourth embodiment. In the fourth embodiment, the inner heat exchanger 23 described in the above third embodiment is combined with the ejector cycle device 10 of the above-described second embodiment. In the fourth embodiment, the function of the inner heat exchanger 23 is similar to that of the above-described third embodiment.

Fifth Embodiment

Figure 5:
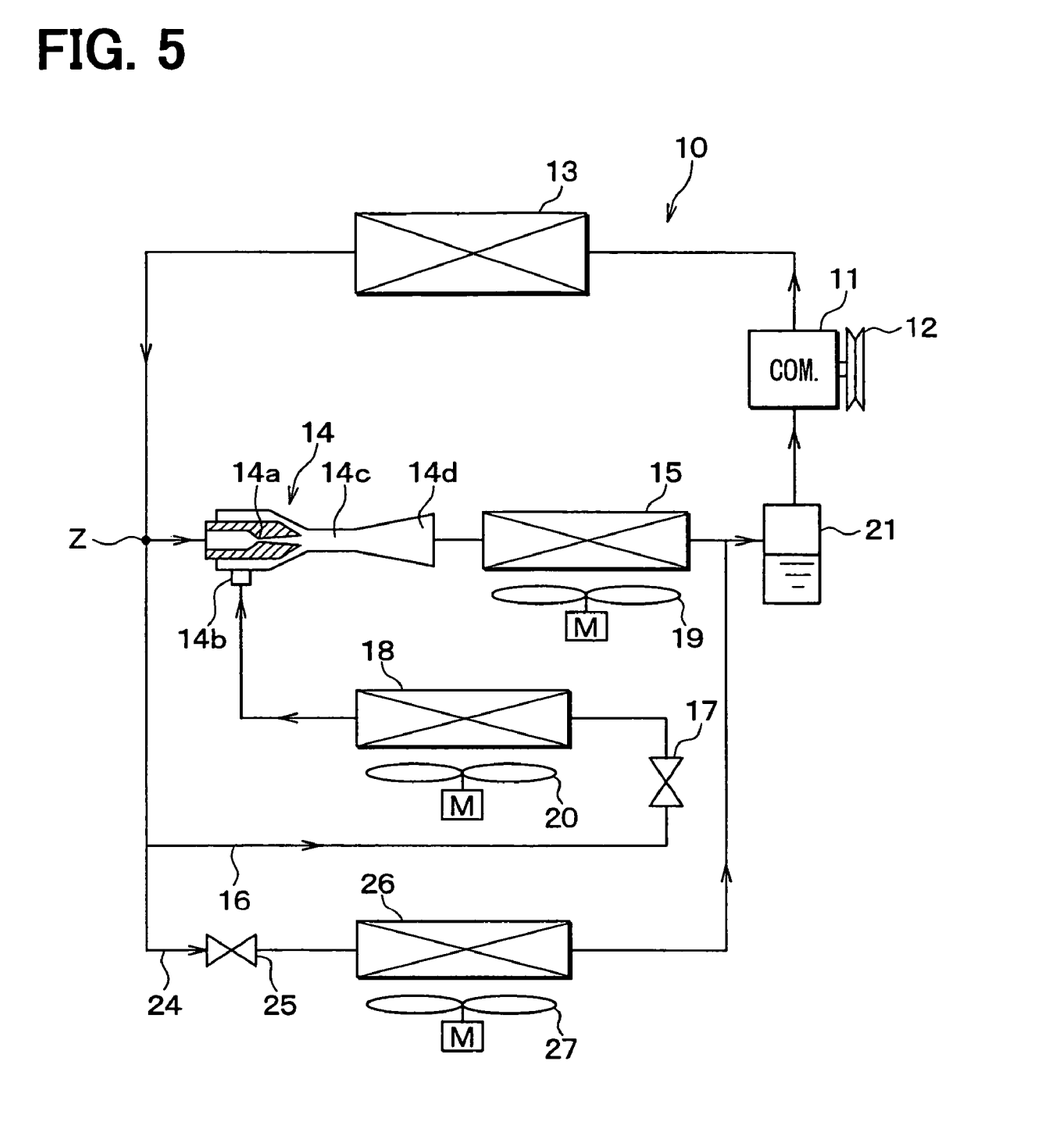
FIG. 5 is a schematic diagram showing an ejector cycle device according to a fifth embodiment of the present invention.

FIG. 5 shows an ejector cycle device 10 of the fifth embodiment. In the fifth embodiment, a second branch passage 24 is added in and combined with the ejector cycle device 10 of the above-described first embodiment.

The second branch passage 24 is branched from the first branch passage 16 upstream from a refrigerant inlet of the throttle mechanism 17, and is joined to a position of the refrigerant cycle between the refrigerant outlet side of the first evaporator 15 and the refrigerant inlet of the accumulator 21. That is, the second branch passage 24 is branched at a portion between the refrigerant radiator 13 and the inlet of the nozzle portion 14a so that the refrigerant from the refrigerant radiator 13 can be introduced into the second branch passage 24.

A throttle mechanism 25 and the third evaporator 26 are arranged in the second branch passage 24 so that refrigerant decompressed in the throttle mechanism 25 is introduced into the third evaporator 26. The throttle mechanism 25 has a decompression means for decompressing refrigerant while having a refrigerant amount adjusting function for adjusting the refrigerant amount flowing into the third evaporator 26. For example, the throttle mechanism 25 is a fixed throttle such as an orifice. Alternatively, an electrical control valve, in which a valve open degree (passage throttle open degree) is adjusted by an electrical actuator, can be used as the throttle mechanism 25. An electrical blower 27 is located to blow air toward the third evaporator 26, so that the third evaporator 26 has a cooling capacity.

The refrigerant outlet side of the third evaporator 26 is coupled with the refrigerant outlet side of the first evaporator 15 at a join portion, and the join portion is connected to the refrigerant inlet side of the accumulator 21. Thus, the refrigerant evaporation pressure of the third evaporator 26 is substantially equal to that of the first evaporator 15, and therefore, the refrigerant evaporation temperature of the third evaporator 26 is substantially equal to that of the first evaporator 15.

For example, in the fifth embodiment, a front space in a passenger compartment of a vehicle can be set as a cooling subject space of the first evaporator 15, and a rear space in the passenger compartment of the vehicle can be set as a cooling subject space of the third evaporator 26, so that the front space and the rear space of the passenger compartment can be cooled simultaneously. At the same time, the second evaporator 18 can be used for cooling the interior of the refrigerator mounted to the vehicle, similarly to the above-described first embodiment.

In the fifth embodiment, the other parts can be set similarly to the above-described first embodiment.

Sixth Embodiment

Figure 6:
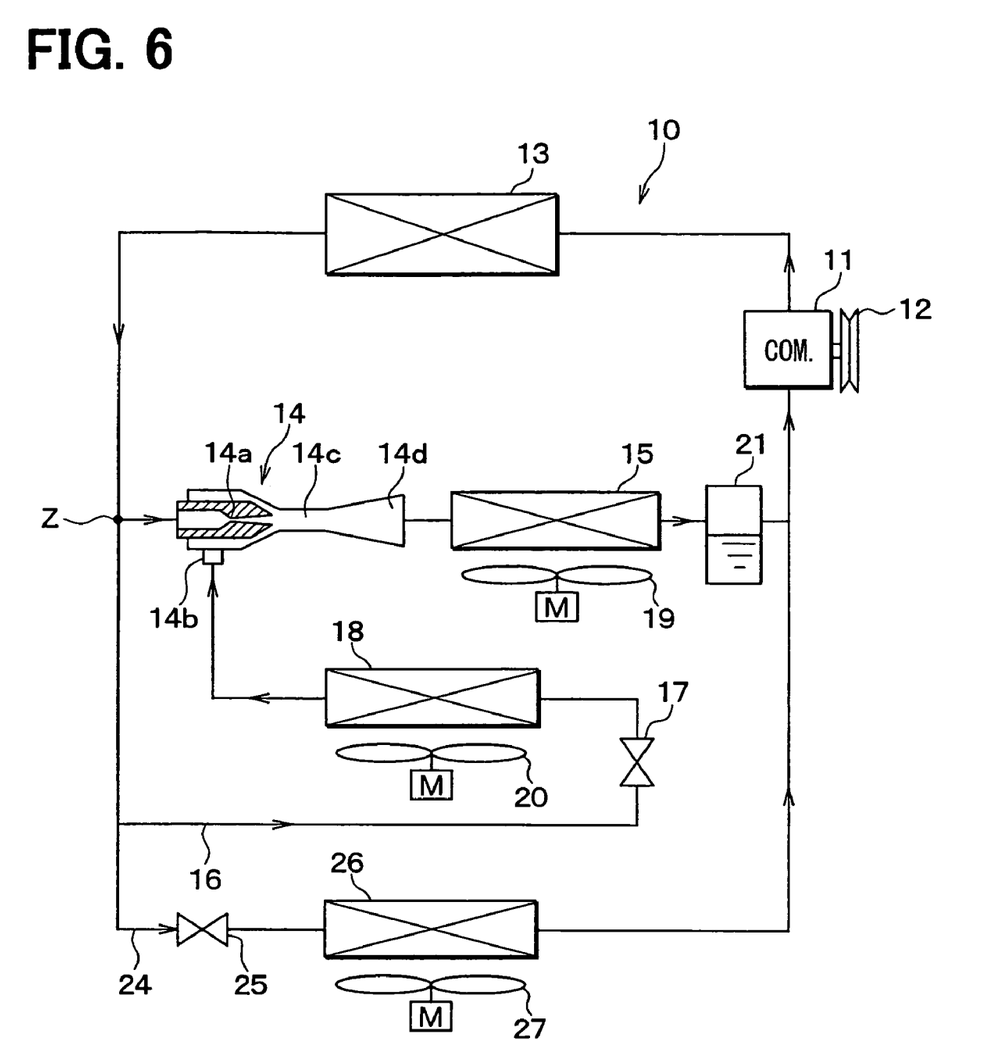
FIG. 6 is a schematic diagram showing an ejector cycle device according to a sixth embodiment of the present invention.

FIG. 6 shows an ejector cycle device 10 of the sixth embodiment. The sixth embodiment is a modification of the above-described fifth embodiment. In the sixth embodiment, the downstream end of the second branch passage 24 described in the fifth embodiment is connected to a refrigerant outlet side of the accumulator 21, instead of the refrigerant inlet side of the accumulator 21 described in the fifth embodiment.

According to the sixth embodiment, the refrigerant outlet side of the third evaporator 26 is connected to a position between the accumulator 21 and the compressor 11, so that the refrigerant flowing out of the third evaporator 26 can be directly drawn into the compressor 11, without passing through the accumulator 21. In a case where the cooling load of the third evaporator 26 is small and the refrigerant amount flowing into the third evaporator 26 is small, even when liquid refrigerant is contained in the refrigerant at the refrigerant outlet of the third evaporator 26, the damage to the compressor 11 can be effectively restricted because the liquid refrigerant is mixed with the saturation gas refrigerant at the refrigerant outlet side of the accumulator 21.

Furthermore, when an expansion valve capable of controlling a super-heating degree of the refrigerant at the refrigerant outlet of the third evaporator 26 is used as the throttle mechanism 25 of the second branch passage 24, liquid refrigerant returning from the refrigerant outlet of the third evaporator 26 to the suction side of the compressor 11 can be accurately prevented.

In the ejector cycle device shown in FIG. 6, when the second refrigerant passage portion 23b of the inner heat exchanger 23 shown in FIGS. 3 and 4 is provided at a position downstream from the joining point between the refrigerant outlet of the third evaporator 27 and the refrigerant outlet side of the accumulator 21, liquid refrigerant contained in the low-pressure refrigerant from the third evaporator 26 absorbs heat from the high-pressure refrigerant flowing through the first refrigerant passage portion 23a of the inner heat exchanger 23. In this case, it can accurately prevent liquid refrigerant from the third evaporator 26 from being drawn into the compressor 11.

Seventh Embodiment

In the above-described first to sixth embodiments, because only the ejector 14 is connected with the first evaporator 15 in series, the ejector 14 adjusts the flow amount of refrigerant to the first evaporator 15, while having pump function with a pressure difference between the first evaporator 15 and the second evaporator 18. In this case, the ejector 14 needs to have the refrigerant amount adjusting function and the pump function. Therefore, the structure of the ejector 14 is designed based on the capacity of the first evaporator 15, in order to obtain the refrigerant amount adjusting function of the first evaporator 15.

Figure 7:
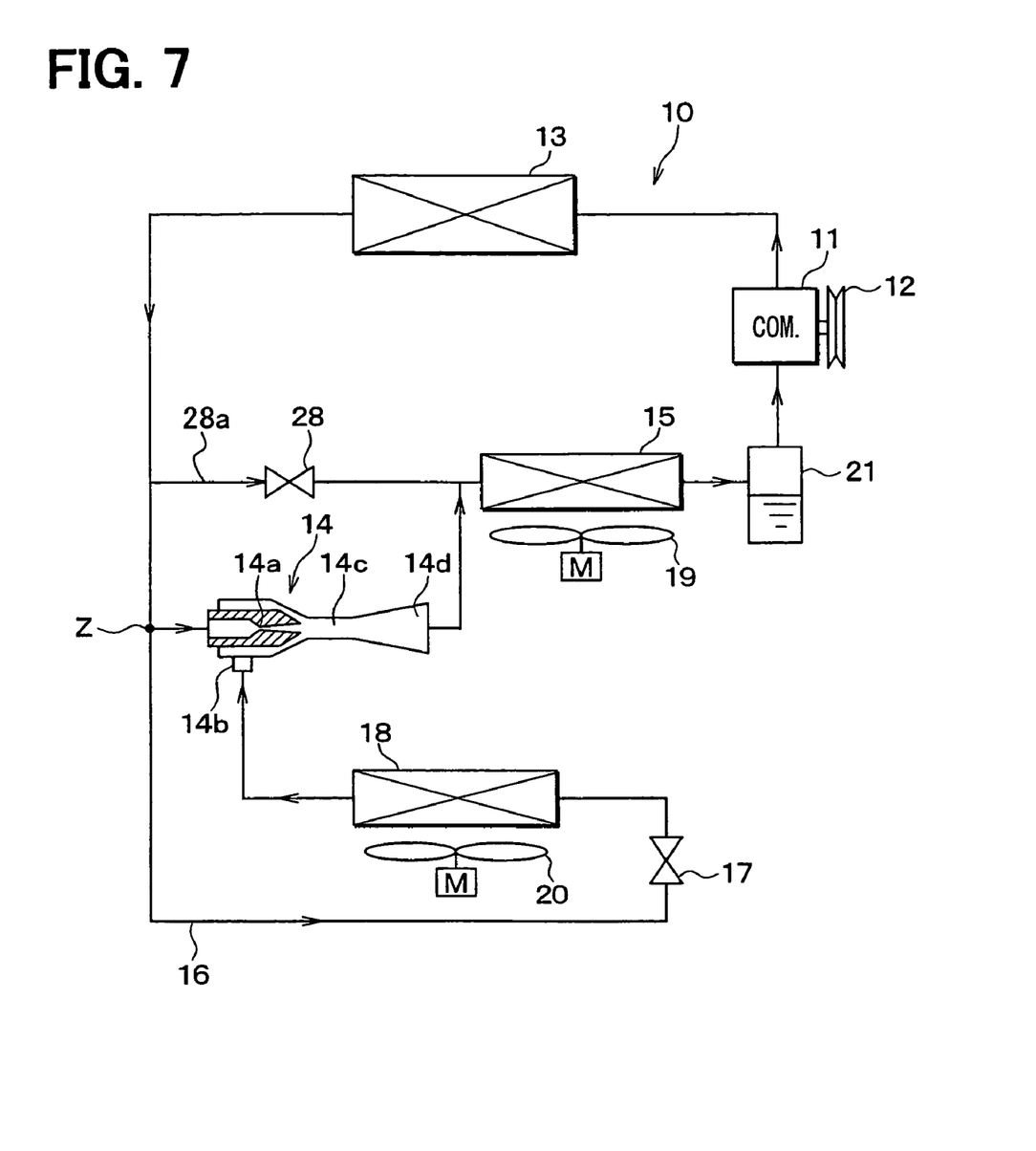
FIG. 7 is a schematic diagram showing an ejector cycle device according to a seventh embodiment of the present invention.

In view this problem, in the seventh embodiment, the ejector 14 is used to have mainly the pump function, without having the refrigerant amount adjusting function of the first evaporator 15. In this case, the ejector cycle device can be operated with a high efficiency while the structure of the ejector 14 can be easily set.

In an ejector cycle device 10 of the seventh embodiment, a refrigerant passage 28a, through which refrigerant from refrigerant radiator 13 flows into the first evaporator 15 while bypassing the ejector 14, is provided as shown in FIG. 7. Furthermore, a throttle mechanism 28 (throttle member) is provided in refrigerant passage 28a between the refrigerant outlet side of the refrigerant radiator 13 and the refrigerant inlet side of the first evaporator 15.

The ejector 14 is provided in parallel with the throttle mechanism 28, so that refrigerant passing through the ejector 14 bypasses the throttle mechanism 28. The refrigerant outlet of the ejector 14 is joined to a portion between the throttle mechanism 28 and the first evaporator 15. Various types of throttles can be used as the throttle mechanism 28. For example, a fixed throttle can be used as the throttle mechanism 28.

Similarly to the first embodiment, the throttle mechanism 17 and the second evaporator 18 are arranged in the branch passage 16 in series, and the refrigerant outlet side of the second evaporator 18 is connected to the suction port 14b of the ejector 14.

Next, operation of the ejector cycle device 10 according to the seventh embodiment will be described. When the compressor 11 is operated, high-temperature high-pressure refrigerant discharged from the compressor 11 is cooled in the refrigerant radiator 13 by outside air. The cooled refrigerant from the refrigerant radiator 13 is branched into three streams. That is, refrigerant of the first stream from the refrigerant radiator 13 is decompressed while passing through the throttle mechanism 28, and refrigerant of the second stream from the refrigerant radiator 13 is decompressed while passing through the nozzle portion 14a and is pressure-increased while passing through the diffuser portion 14d. Furthermore, refrigerant of the third stream from the refrigerant radiator 13 is decompressed while passing through the throttle mechanism 17 of the branch passage 16. The refrigerant from the throttle mechanism 28 and the refrigerant from the ejector 14 flow into the first evaporator 15, and the refrigerant from the throttle mechanism 16 of the branch passage 16 is drawn into the suction port 14b of the ejector 14.

Even in the seventh embodiment, the ejector 14 has the pump function, such that the refrigerant at the refrigerant outlet of the second evaporator 18 is drawn into the ejector 14 to be mixed with the refrigerant jetted from the nozzle portion 14a, and the mixed refrigerant is pressurized in the diffuser portion 14d. Therefore, the refrigerant evaporation pressure of the first evaporator 15 is higher than the refrigerant evaporation pressure of the second evaporator 18, so as to form a predetermined pressure difference (refrigerant evaporation temperature difference) between the first evaporator 15 and the second evaporator 18.

Because the refrigerant amount flowing to the first evaporator 15 can be adjusted by the fixed throttle 28, the ejector 14 can be set without considering the refrigerant flow amount to the first evaporator 15. In addition, the refrigerant amount flowing into the second evaporator 18 can be adjusted by the throttle mechanism 17. Thus, the ejector 14 can be provided mainly to set a pressure difference between the first evaporator 15 and the second evaporator 18.

In this embodiment, the shape of the ejector 14 is suitably designed, so that the refrigerant amount passing through the ejector 14 is adjusted in a predetermined range, and a predetermined pressure difference is set between both the first and second evaporators 15, 18. In this case, the ejector cycle device 10 can be operated with a high efficiency, even when cycle operation conditions (e.g., compressor rotation speed, outside air temperature, the temperature of the cooling subject space) are changed.

Furthermore, because the ejector 14 can be set to have mainly the pump function, a fixed nozzle can be used as the nozzle portion 14a in the ejector 14. In this case, the product cost of the ejector 14 can be reduced.

Eighth Embodiment

Figure 8:
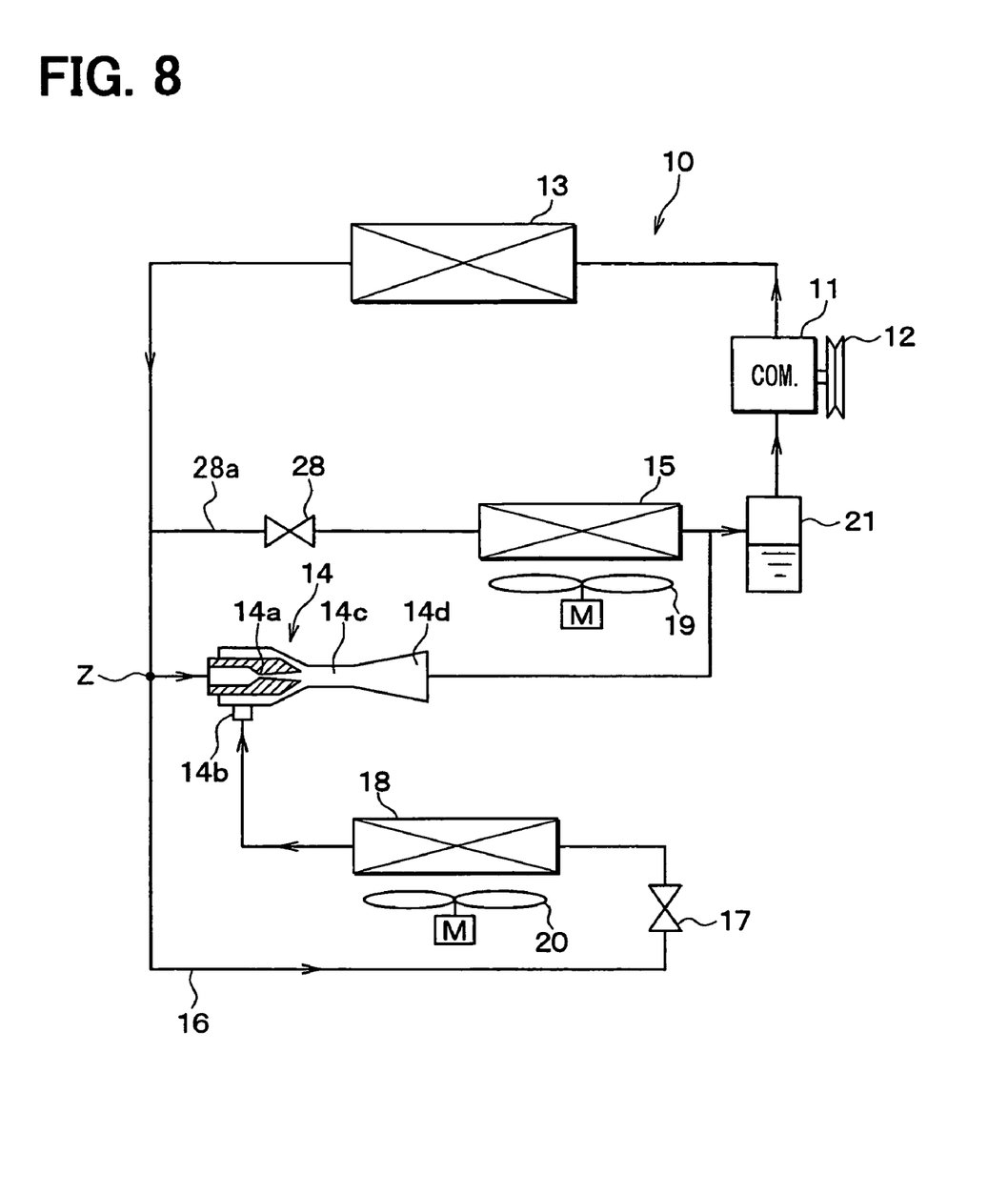
FIG. 8 is a schematic diagram showing an ejector cycle device according to an eighth embodiment of the present invention.

FIG. 8 shows an ejector cycle device 10 of the eighth embodiment which is a modification of the above-described seventh embodiment.

In the above-described seventh embodiment, the refrigerant outlet of the ejector 14 is joined to the inlet side of the first evaporator 15. However, in the eighth embodiment, the refrigerant outlet of the ejector 14 is joined to the refrigerant outlet side of the first evaporator 15 at a position between the first evaporator 15 and the accumulator 21. In this case, the shape of the ejector 14 can be easily set so that the ejector cycle device 10 is operated with high efficiency, regardless of the cycle operation conditions.

In this embodiment, even when the refrigerant outlet of the ejector 14 is joined to the refrigerant outlet side of the evaporator 15, because the refrigerant after passing through the ejector 14 flows into the accumulator 21, it can prevent liquid refrigerant from being introduced into the compressor 11 from the ejector 14.

Ninth Embodiment

Figure 9:
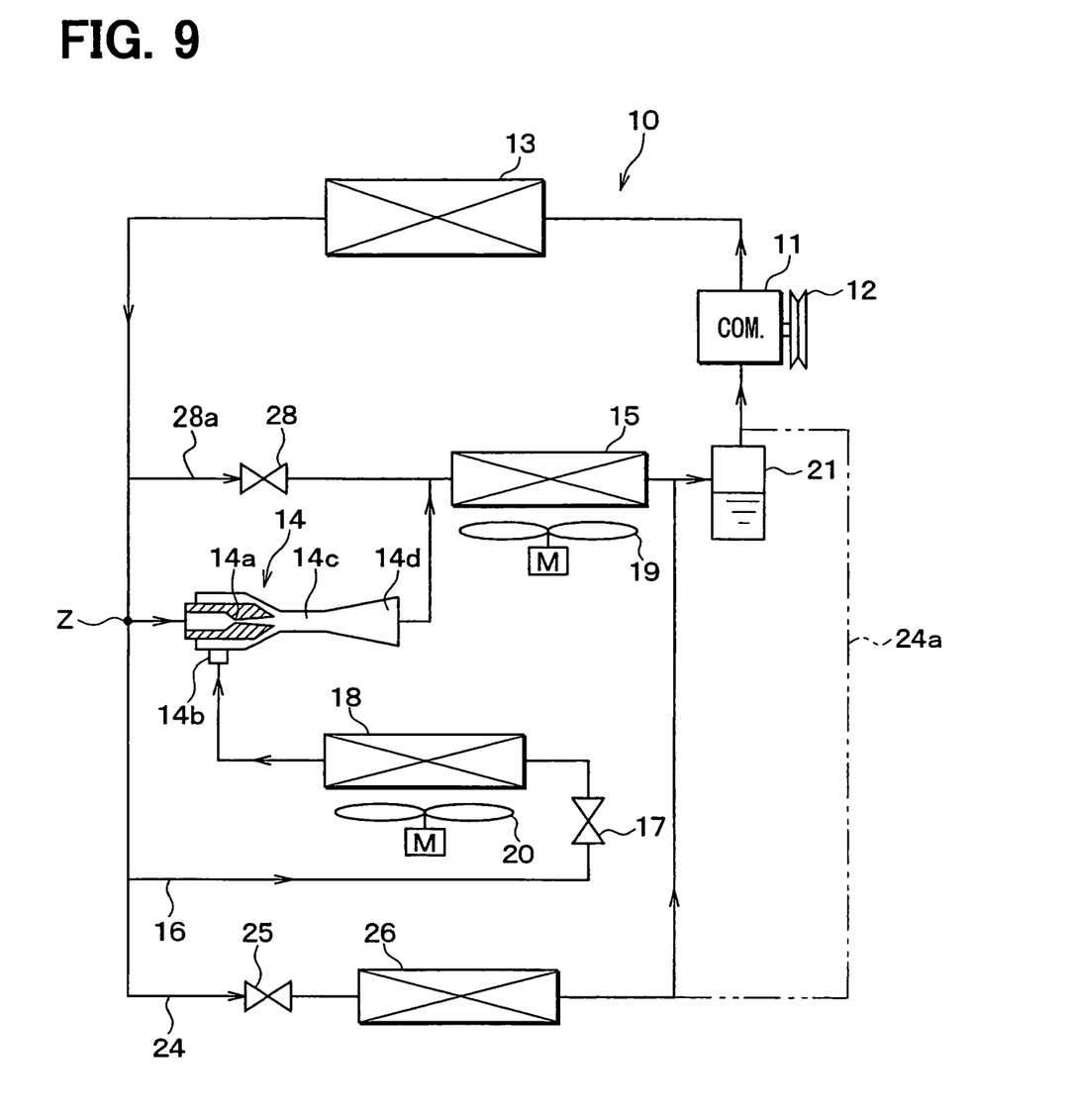
FIG. 9 is a schematic diagram showing an ejector cycle device according to a ninth embodiment of the present invention.

FIG. 9 shows an ejector cycle device 10 of the ninth embodiment which is a modification of the above-described seventh embodiment. In the Ninth embodiment, the second branch passage 24 having the throttle mechanism 25 and the third evaporator 26, described in the fifth and sixth embodiments, is added in the structure of the ejector cycle device 10 of the above-described seventh embodiment.

As shown in FIG. 9, the second branch passage 24 is branched from a portion between the refrigerant radiator 13 and the inlet of the nozzle portion 14a, and is joined to a portion between the first evaporator 15 and the accumulator 21 as shown by the solid line in FIG. 9, or a portion between the accumulator 21 and the compressor 11 as shown by the chain line 24a in FIG. 9.

Tenth Embodiment

Figure 10:
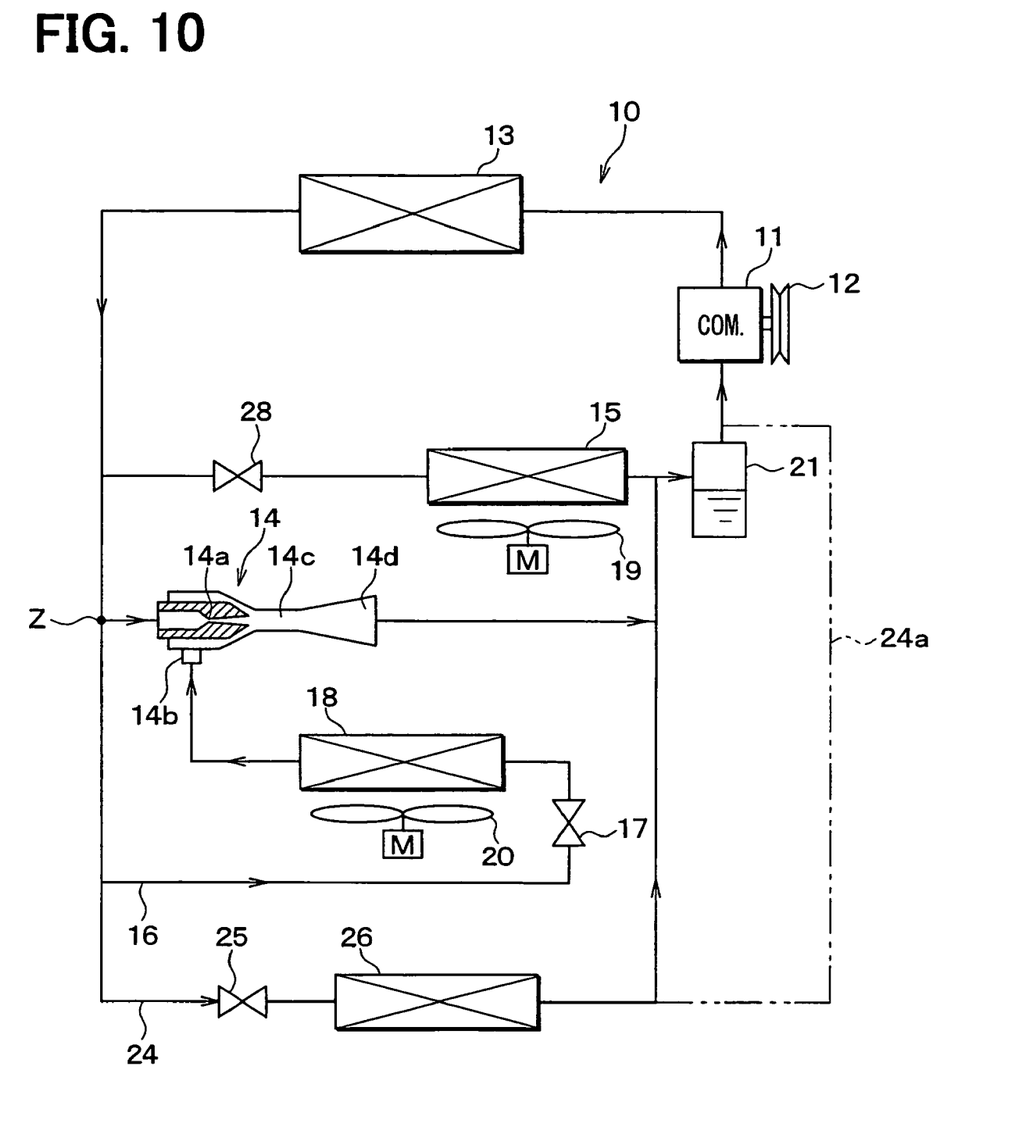
FIG. 10 is a schematic diagram showing an ejector cycle device according to a tenth embodiment of the present invention.

FIG. 10 shows an ejector cycle device 10 of the tenth embodiment which is a modification of the above-described eighth embodiment. In the tenth embodiment, the second branch passage 24 having the throttle mechanism 25 and the third evaporator 26, described in the fifth and sixth embodiments, is added in the structure of the ejector cycle device 10 of the above-described eighth embodiment.

As shown in FIG. 10, the second branch passage 24 is branched from a portion between the refrigerant radiator 13 and the inlet of the nozzle portion 14a, and is joined to a portion between the first evaporator 15 and the accumulator 21 as shown by the solid line in FIG. 10, or a portion between the accumulator 21 and the compressor 11 as shown by the chain line 24a in FIG. 10.

Other Embodiment

Although the present invention has been fully described in connection with the preferred embodiments thereof with reference to the accompanying drawings, it is to be noted that various changes and modifications will become apparent to those skilled in the art.

For example, in the above-described embodiments, electric control valves such as electromagnetic valves for adjusting flow amounts of refrigerant flowing into the first, second and third evaporators 15, 18 or/and 26 can be provided in the refrigerant passage for the first evaporator 15, and the first and second branch passages 16 and 24. In this case, the flow of refrigerant to the first evaporator 15, the second evaporator 18 and the third evaporator 26 can be selectively switched and adjusted.

In the above-described seventh to tenth embodiments, the first evaporator 15 and the second evaporator 18 can be assembled to form an integrated unit to cool a single cooling subject. Furthermore, in the above-described embodiments, the first, second and third evaporators 15, 18, 26 may be assembled integrally to form an integrated unit to cool a single cooling subject.

In the above-described embodiments, when electric control valves such as the electromagnetic valves can be used as the throttle mechanisms 17, 25, 28. In this case, the throttle mechanisms 17, 25, 28 have passage switching functions, and can suitably switch and adjust a refrigerant flow in the ejector cycle device 10.

In the above-described first embodiment, carbon dioxide is used as refrigerant so that the pressure of the high-pressure refrigerant becomes higher than the critical pressure. However, the present invention can be suitably used for a refrigerant cycle in which the pressure of high-pressure refrigerant is lower than the critical pressure. In this case, the high-temperature and high-pressure refrigerant from the compressor 10 is cooled and condensed in the refrigerant radiator 13. Furthermore, the kind of refrigerant is not limited. For example, Freon refrigerant, HC refrigerant can be suitably used. Here, the Freon refrigerant is an organic chemistry material composed of Carbon, Chlorine and Hydrogen, such as HCFC (hydrochlorofluorocarbon), HFC (hydrochlorocarbon). HC refrigerant is an organic chemistry material composed of Carbon and Hydrogen, such as R600a (isobutene), R290 (propane).

In the above-described embodiments, the ejector 14 has the fixed nozzle portion 14a. However, as the ejector 14, a variable ejector having a variable nozzle portion can be used. As an example of the variable nozzle portion, a needle is inserted into a throttle passage portion of the nozzle portion, and the position of the needle is adjusted by an electrical actuator.

In the above-described first embodiment, the ejector cycle device 10 is typically used for a vehicle air conditioner and a refrigerator mounted to the vehicle. However, the evaporators 15, 18, 26 can be used for cooling plural cooling subjects, e.g., different spaces in a passenger compartment of a vehicle, different spaces in an interior of a refrigerator for the other use. For example, the first evaporator 15 having a relative high refrigerant evaporation temperature and the second evaporator 18 having a relative low refrigerant evaporation temperature can be used for cooling different rooms of a refrigerator. In this case, the first evaporator 15 having the relative high refrigerant evaporation temperature is used for performing cooling operation of a refrigerator room of the refrigerator, and the second evaporator 18 having the relative low refrigerant evaporation temperature can be used for performing cooling operation of a freezing room in the refrigerator.

Alternatively, the ejector cycle device 10 can be used for a heat pump cycle device used for a water heater for heating water. Furthermore, the ejector cycle device 10 can be used for a vapor-compression ejector cycle device for the other use.

In the above-described embodiments, the throttle mechanisms 17, 25, 28 can be provided with electromagnetic valve functions having a passage shutting function.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. An ejector cycle device comprising:
   a compressor for compressing refrigerant;
   a refrigerant radiator disposed to radiate heat of refrigerant discharged from the compressor;

an ejector which includes a nozzle portion for decompressing and expanding refrigerant from the refrigerant radiator, a refrigerant suction port from which refrigerant is drawn by a refrigerant steam jetted from the nozzle portion, and a pressure-increasing portion in which the refrigerant jetted from the nozzle portion and the refrigerant drawn from the refrigerant suction port are mixed and pressure of the refrigerant is increased by converting speed energy to pressure energy;

a first evaporator for evaporating refrigerant flowing out of the ejector;

a first branch passage, which is branched from a position between a refrigerant downstream side of the refrigerant radiator and an upstream side of the nozzle portion, and is connected to the refrigerant suction port of the ejector;

a first throttle member disposed in the first branch passage to decompress refrigerant flowing from the refrigerant radiator;

a second evaporator disposed in the first branch passage between the first throttle member and the refrigerant suction port of the ejector; and a gas-liquid separator located between a refrigerant outlet of the first evaporator and a refrigerant suction side of the compressor for separating refrigerant into gas refrigerant and liquid refrigerant, wherein the gas-liquid separator has only a single outlet from which the separated gas refrigerant is introduced to the refrigerant suction side of the compressor; wherein the gas liquid separator includes an inlet which receives refrigerant directly from the first evaporator.

2. The ejector cycle device according to claim 1, wherein the first evaporator is located to cool a first cooling subject, and the second evaporator is located to cool a second cooling subject different from the first cooling subject.

3. The ejector cycle device according to claim 1, further comprising:

a second branch passage which is branched from a position between the refrigerant downstream side of the refrigerant radiator and the upstream side of the nozzle portion, and is connected to the inlet of the gas-liquid separator;

a second throttle member, disposed in the second branch passage, for decompressing refrigerant; and a third evaporator for evaporating refrigerant to have a cooling capacity, wherein the third evaporator is disposed in the second branch passage at a position downstream from the second throttle member.

4. The ejector cycle device according to claim 1, further comprising:

a second branch passage which is branched from a position between the refrigerant downstream side of the refrigerant radiator and the upstream side of the nozzle portion, and is connected to the outlet of the gas-liquid separator;

a second throttle member, disposed in the second branch passage, for decompressing refrigerant; and a third evaporator for evaporating refrigerant to have a cooling capacity, wherein the third evaporator is disposed in the second branch passage at a position downstream from the second throttle member.

5. The ejector cycle device according to claim 3, wherein:

the second evaporator is operated with a refrigerant evaporation pressure lower than a refrigerant evaporation pressure of the first evaporator; and the third evaporator is operated with a refrigerant evaporation pressure approximately equal to the refrigerant evaporation pressure of the first evaporator.

6. The ejector cycle device according to claim 1, wherein the first evaporator and the second evaporator are assembled to form an integrated unit.

7. The ejector cycle device according to claim 1, further comprising an inner heat exchanger which is located to perform heat exchange between refrigerant from the gas-liquid separator and refrigerant from the refrigerant radiator.

8. The ejector cycle device according to claim 1, wherein the refrigerant flowing into the refrigerant radiator has a pressure higher than the critical pressure of the refrigerant.

9. The ejector cycle device according to claim 1, wherein the single outlet of the gas-liquid separator is directly connected to the refrigerant suction side of the compressor.

10. The ejector cycle device according to claim 1, wherein the single outlet of the gas-liquid separator is directly connected to an inlet side of a refrigerant passage of an inner heat exchanger.

11. An ejector cycle device comprising:

a compressor for compressing refrigerant;

a refrigerant radiator disposed to radiate heat of refrigerant discharged from the compressor;

a first throttle member for decompressing refrigerant from the refrigerant radiator;

a first evaporator for evaporating refrigerant flowing out of the first throttle member;

an ejector which includes a nozzle portion for decompressing and expanding refrigerant from the refrigerant radiator, a refrigerant suction port from which refrigerant is drawn by a refrigerant steam jetted from the nozzle portion, and a pressure-increasing portion in which the refrigerant jetted from the nozzle portion and the refrigerant drawn from the refrigerant suction port are mixed and pressure of the refrigerant is increased by converting speed energy to pressure energy;

a first branch passage which is branched from a position between a refrigerant downstream side of the refrigerant radiator and an upstream side of the nozzle portion, and is connected to the refrigerant suction port of the ejector;

a second throttle member disposed in the first branch passage to decompress refrigerant flowing from the refrigerant radiator;

a second evaporator disposed in the first branch passage between the second throttle member and the refrigerant suction port of the ejector; and a gas-liquid separator located between a refrigerant outlet of the first evaporator and a refrigerant suction side of the compressor for separating refrigerant into gas refrigerant and liquid refrigerant, wherein the gas-liquid separator has only a single outlet from which the separated gas refrigerant is introduced to the refrigerant suction side of the compressor; wherein the gas liquid separator includes an inlet which receives refrigerant directly from the first evaporator.

12. The ejector cycle device according to claim 11, wherein the ejector has an outlet connected to an inlet of the first evaporator.

13. The ejector cycle device according to claim 11, wherein the ejector has an outlet connected to the inlet of the gas-liquid separator.

14. The ejector cycle device according to claim 11, further comprising:

a second branch passage which is branched from a position between the refrigerant downstream side of the refrigerant radiator and the upstream side of the nozzle portion, and is connected to the inlet of the gas-liquid separator;

a third throttle member, disposed in the second branch passage, for decompressing refrigerant; and a third evaporator for evaporating refrigerant to have a cooling capacity, wherein the third evaporator is disposed in the second branch passage at a position downstream from the third throttle member.

15. The ejector cycle device according to claim 11, wherein the second evaporator is operated with a refrigerant evaporation pressure lower than a refrigerant evaporation pressure of the first evaporator.

16. The ejector cycle device according to claim 14, wherein:
the second evaporator is operated with a refrigerant evaporation pressure lower than a refrigerant evaporation pressure of the first evaporator; and
the third evaporator is operated with a refrigerant evaporation pressure approximately equal to the refrigerant evaporation pressure of the first evaporator.

17. The ejector cycle device according to claim 11, wherein the first evaporator and the second evaporator are assembled to form an integrated unit.

18. The ejector cycle device according to claim 11, further comprising
an inner heat exchanger which is located to perform heat exchange between refrigerant from the gas-liquid separator and refrigerant from the refrigerant radiator.

19. The ejector cycle device according to claim 11, wherein the refrigerant flowing into the refrigerant radiator has a pressure higher than the critical pressure of the refrigerant.

20. The ejector cycle device according to claim 11, wherein the single outlet of the gas-liquid separator is directly connected to the refrigerant suction side of the compressor.

21. The ejector cycle device according to claim 11, wherein the single outlet of the gas-liquid separator is directly connected to an inlet side of a refrigerant passage of an inner heat exchanger.

22. An ejector cycle device comprising:
a compressor for compressing refrigerant;
a refrigerant radiator disposed to radiate heat of refrigerant discharged from the compressor;
an ejector which includes a nozzle portion for decompressing and expanding refrigerant from the refrigerant radiator, a refrigerant suction port from which refrigerant is drawn by a refrigerant steam jetted from the nozzle portion, and a pressure-increasing portion in which the refrigerant jetted from the nozzle portion and the refrigerant drawn from the refrigerant suction port are mixed and pressure of the refrigerant is increased by converting speed energy to pressure energy;
a first evaporator for evaporating refrigerant flowing out of the ejector;
a first branch passage, which is branched from a position between a refrigerant downstream side of the refrigerant radiator and an upstream side of the nozzle portion, and is connected to the refrigerant suction port of the ejector;
a first throttle member disposed in the first branch passage to decompress refrigerant flowing from the refrigerant radiator;
a second evaporator disposed in the first branch passage between the first throttle member and the refrigerant suction port of the ejector;
a gas-liquid separator located between a refrigerant outlet of the first evaporator and a refrigerant suction side of the compressor for separating refrigerant into gas refrigerant and liquid refrigerant, wherein the gas-liquid separator has an outlet from which the separated gas refrigerant is introduced to the refrigerant suction side of the compressor;
a second branch passage which is branched from a position between the refrigerant downstream side of the refrigerant radiator and the upstream side of the nozzle portion, and is connected to an inlet side of the gas-liquid separator;
a second throttle member, disposed in the second branch passage, for decompressing refrigerant; and
a third evaporator for evaporating refrigerant to have a cooling capacity, wherein the third evaporator is disposed in the second branch passage at a position downstream from the second throttle member.

23. The ejector cycle device according to claim 22, further comprising:
a third branch passage which is branched from a position between the refrigerant downstream side of the refrigerant radiator and the upstream side of the nozzle portion and is connected to an inlet of the first evaporator; and
a third throttle member disposed in the third branch passage.

24. An ejector cycle device comprising:
a compressor for compressing refrigerant;
a refrigerant radiator disposed to radiate heat of refrigerant discharged from the compressor;
an ejector which includes a nozzle portion for decompressing and expanding refrigerant from the refrigerant radiator, a refrigerant suction port from which refrigerant is drawn by a refrigerant steam jetted from the nozzle portion, and a pressure-increasing portion in which the refrigerant jetted from the nozzle portion and the refrigerant drawn from the refrigerant suction port are mixed and pressure of the refrigerant is increased by converting speed energy to pressure energy;
a first evaporator for evaporating refrigerant flowing out of the ejector;
a first branch passage, which is branched from a position between a refrigerant downstream side of the refrigerant radiator and an upstream side of the nozzle portion, and is connected to the refrigerant suction port of the ejector;
a first throttle member disposed in the first branch passage to decompress refrigerant flowing from the refrigerant radiator;
a second evaporator disposed in the first branch passage between the first throttle member and the refrigerant suction port of the ejector;
a gas-liquid separator located between a refrigerant outlet of the first evaporator and a refrigerant suction side of the compressor for separating refrigerant into gas refrigerant and liquid refrigerant, wherein the gas-liquid separator has an outlet from which the separated gas refrigerant is introduced to the refrigerant suction side of the compressor;
a second branch passage which is branched from a position between the refrigerant downstream side of the refrigerant radiator and the upstream side of the nozzle portion, and is connected to an outlet side of the gas-liquid separator;
a second throttle member, disposed in the second branch passage, for decompressing refrigerant; and
a third evaporator for evaporating refrigerant to have a cooling capacity, wherein the third evaporator is disposed in the second branch passage at a position downstream from the second throttle member.

25. The ejector cycle device according to claim 24, further comprising:

a third branch passage which is branched from a position between the refrigerant downstream side of the refrigerant radiator and the upstream side of the nozzle portion and is connected to an inlet of the first evaporator; and a third throttle member disposed in the third branch passage.

26. An ejector cycle device comprising:

a compressor for compressing refrigerant;

a refrigerant radiator disposed to radiate heat of refrigerant discharged from the compressor;

an ejector which includes a nozzle portion for decompressing and expanding refrigerant from the refrigerant radiator, a refrigerant suction port from which refrigerant is drawn by a refrigerant steam jetted from the nozzle portion, and a pressure-increasing portion in which the refrigerant jetted from the nozzle portion and the refrigerant drawn from the refrigerant suction port are mixed and pressure of the refrigerant is increased by converting speed energy to pressure energy;

a first evaporator for evaporating refrigerant flowing out of the ejector;

a first branch passage, which is branched from a position between a refrigerant downstream side of the refrigerant radiator and an upstream side of the nozzle portion, and is connected to the refrigerant suction port of the ejector;

a first throttle member disposed in the first branch passage to decompress refrigerant flowing from the refrigerant radiator;

a second evaporator disposed in the first branch passage between the first throttle member and the refrigerant suction port of the ejector; and a gas-liquid separator located between a refrigerant outlet of the first evaporator and a refrigerant suction side of the compressor for separating refrigerant into gas refrigerant and liquid refrigerant, wherein the gas-liquid separator has an outlet from which the separated gas refrigerant is introduced to the refrigerant suction side of the compressor;

wherein the first evaporator and the second evaporator are assembled to form an integrated unit.

27. The ejector cycle device according to claim 26, further comprising:

a second branch passage which is branched from a position between the refrigerant downstream side of the refrigerant radiator and the upstream side of the nozzle portion and is connected to an inlet of the first evaporator; and a second throttle member disposed in the third branch passage.

* * * * *